US012606252B2

(12) United States Patent (10) Patent No.: US 12,606,252 B2

Coupe et al. (45) Date of Patent: Apr. 21, 2026

(54) SET OF DASHBOARD CROSSBEAM ASSEMBLIES FOR A VEHICLE

(71) Applicant: FAURECIA INTERIEUR INDUSTRIE, Nanterre (FR)

(72) Inventors: Christophe Coupe, Crillon (FR); Mickaël Trannoy, Cauvigny (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 374 days.

(21) Appl. No.: 18/336,929

(22) Filed: Jun. 16, 2023

(65) Prior Publication Data

US 2023/0415821 A1 Dec. 28, 2023

(30) Foreign Application Priority Data

Jun. 23, 2022 (FR) ................................. FR22 06280

(51) Int. Cl.
B62D 25/14 (2006.01)
B62D 27/06 (2006.01)
B62D 29/00 (2006.01)

(52) U.S. Cl.
CPC ......... B62D 25/147 (2013.01); B62D 27/065 (2013.01); B62D 29/001 (2013.01)

(58) Field of Classification Search
CPC .... B62D 25/14; B62D 25/145; B62D 25/147; B62D 27/065
USPC ........................................ 296/70, 72, 193.02
See application file for complete search history.

(56) References Cited

U.S. PATENT DOCUMENTS

| | | | | |
|---|---|---|---|---|
| 6,391,470 | B1* | 5/2002 | Schmieder | ........... B62D 25/145 |
| | | | | 296/72 |
| 7,048,325 | B1* | 5/2006 | Sandhu | ............... B62D 25/147 |
| | | | | 296/70 |
| 7,458,625 | B2* | 12/2008 | Kimura | ............... B62D 25/145 |
| | | | | 296/70 |
| 8,474,902 | B2 | 7/2013 | Malek | |
| 11,440,595 | B2* | 9/2022 | Richardson | .......... B62D 29/001 |
| 11,724,748 | B2* | 8/2023 | Richardson | .......... B62D 25/145 |
| | | | | 296/193.02 |
| 2004/0036310 | A1* | 2/2004 | Mills | .................... B62D 25/145 |
| | | | | 296/72 |
| 2011/0278876 | A1* | 11/2011 | Hitz | .................... B62D 25/145 |
| | | | | 296/72 |
| 2012/0299333 | A1 | 11/2012 | Busuioc | |
| 2014/0125086 | A1* | 5/2014 | Da Costa Pito | ..... B62D 25/145 |
| | | | | 296/72 |

(Continued)

FOREIGN PATENT DOCUMENTS

| | | |
|---|---|---|
| CN | 106515870 A | 3/2017 |
| DE | 10240395 A1 | 3/2004 |

(Continued)

*Primary Examiner* — Gregory A Blankenship
(74) *Attorney, Agent, or Firm* — Reising Ethington P.C.

(57) ABSTRACT

A set of dashboard crossbeam assemblies for a vehicle includes a first and a second dashboard crossbeam assemblies for the vehicle, each dashboard crossbeam assembly having a crossbeam, whereof at least one first longitudinal portion is made of a plastic-containing material and comprises a plurality of first fastening interfaces of fastening tabs. The first and second dashboard crossbeam assemblies are different, the first longitudinal crossbeam portions of the first and second dashboard crossbeam assemblies being identical.

6 Claims, 5 Drawing Sheets

(56)        References Cited

U.S. PATENT DOCUMENTS

| | | | | |
|---|---|---|---|---|
| 2022/0119042 A1* | 4/2022 | Zhang | .................... | B60K 37/10 |
| 2023/0382465 A1* | 11/2023 | Coupe | .................... | B62D 27/02 |
| 2023/0415821 A1* | 12/2023 | Coupe | ................. | B62D 29/001 |
| 2024/0034413 A1* | 2/2024 | Martin | ................. | B62D 29/005 |
| 2025/0145209 A1* | 5/2025 | Kong | ................. | B62D 29/004 |
| 2025/0162656 A1* | 5/2025 | Gundy | ................. | B62D 25/145 |

FOREIGN PATENT DOCUMENTS

| | | | |
|---|---|---|---|
| DE | 102009006960 A1 | 8/2010 |
| EP | 2377747 A1 | 10/2011 |
| FR | 2976901 A1 | 12/2012 |
| KR | 101989423 B1 | 6/2019 |
| KR | 102304801 B1 | 10/2021 |

* cited by examiner

SET OF DASHBOARD CROSSBEAM ASSEMBLIES FOR A VEHICLE

TECHNICAL FIELD

The present invention relates to the technical field of dashboard crossbeam assemblies for a vehicle (or CCBs, for Cross Car Beams), especially for a motor vehicle.

BACKGROUND

In the automotive field, a dashboard crossbeam assembly is known, which especially allows the dashboard to be connected to the body of the motor vehicle. Such a dashboard crossbeam assembly may also have a safety function, for example by absorbing part of the energy in the event of a frontal impact causing the body to deform, in order to limit the deformation of the dashboard.

Conventionally, such a dashboard crossbeam assembly is made of metal.

However, there is known, for example from application EP-A-2 377 747, a dashboard crossbeam assembly, referred to as a "hybrid" type, partially made of metal and partially of plastic or of composite material. The term "composite material" means a plastic material including reinforcing fibers.

Thus, in EP-A-2 377 747, the dashboard crossbeam assembly comprises a metal tube, partially surrounded by injection-molded plastic around the metal tube.

Such a design requires a mold for injection molding, specific to each developed dashboard crossbeam assembly. In other words, to produce two different dashboard crossbeam assemblies, it is necessary to implement two separate molds. However, such molds are expensive.

SUMMARY

An object of the present invention is to reduce the manufacturing costs of the dashboard crossbeam assemblies for a vehicle.

To this end, a set of dashboard crossbeam assemblies for a vehicle is proposed, comprising:

at least one first dashboard crossbeam assembly for a vehicle, the first dashboard crossbeam assembly comprising a first crossbeam, at least one first longitudinal portion of which is made of a plastic-containing material, the first longitudinal portion comprising a plurality of first fastening interfaces of fastening tabs, and at least one second dashboard crossbeam assembly for a vehicle, the second dashboard crossbeam assembly comprising a second crossbeam, at least one first longitudinal portion of which is made of a plastic-containing material, the first longitudinal portion of the second crossbeam comprising a plurality of second fastening interfaces of fastening tabs, a set wherein the at least one first dashboard crossbeam assembly and the at least one second dashboard crossbeam assembly are different, the first longitudinal portion of the first crossbeam and the first longitudinal portion of the second crossbeam being identical.

Thus, advantageously, the development and manufacturing costs of different dashboard assemblies are reduced by implementing a portion made of material containing identical plastic in different dashboard crossbeam assemblies.

According to preferred embodiments, the set of dashboard crossbeam assemblies has one or more of the following features, taken alone or in combination:

the first dashboard crossbeam assembly comprises at least one first fastening tab attached to at least one first fastening interface according to a first configuration for attaching fastening tabs to the first longitudinal portion of the first crossbeam, the second dashboard crossbeam assembly comprises at least one second fastening tab attached to at least one second fastening interface according to a second configuration for attaching fastening tabs to the first longitudinal portion of the second crossbeam, and the first configuration for attaching fastening tabs to the first longitudinal portion of the first crossbeam is different from the second configuration for attaching fastening tabs to the first longitudinal portion of the second crossbeam;

the first configuration for attaching fastening tabs to the first longitudinal portion of the first crossbeam is different from the second configuration for attaching fastening tabs to the first longitudinal portion of the second crossbeam by the number of fastening tabs;

the first configuration for attaching fastening tabs to the first longitudinal portion of the first crossbeam is different from the second configuration for attaching fastening tabs to the first longitudinal portion of the second crossbeam by at least one fastening tab used;

the first configuration for attaching fastening tabs to the first longitudinal portion of the first crossbeam is different from the second configuration for attaching fastening tabs to the first longitudinal portion of the second crossbeam by the position of at least one fastening interface implemented to attach the fastening tabs;

the plurality of first fastening interfaces of fastening tabs and the plurality of second fastening interfaces of fastening tabs comprise at least one insert for fastening by screwing, by elastic fitting or by force-fitting, attached in the first longitudinal portion of the first, respectively second, crossbeam;

the plurality of first fastening interfaces of fastening tabs and the plurality of second fastening interfaces of fastening tabs comprise at least one relief for fastening by screwing, by elastic fitting or by force insertion, formed by the first longitudinal portion of the first, respectively second, crossbeam;

each crossbeam comprises a second longitudinal portion made of metal, attached to the first longitudinal portion;

the second longitudinal portion of the first crossbeam is different from the second longitudinal portion of the second crossbeam, especially by the length and/or by the diameter of the cross-section;

each dashboard crossbeam assembly comprises at least one first tip for fastening the crossbeam to a motor vehicle body, the first tip of the first dashboard crossbeam assembly being different from the first, tip of the second dashboard crossbeam assembly;

each dashboard crossbeam assembly comprises a steering column support, attached to the second longitudinal portion of the crossbeam;

the first longitudinal portion of the first crossbeam and the second longitudinal portion of the first crossbeam extend substantially longitudinally next to one another in the direction of extension of the first crossbeam, and the first longitudinal portion of the second crossbeam and the second longitudinal portion of the second crossbeam extend substantially longitudinally next to one another in the direction of extension of the second crossbeam;

the first fastening tip is attached to the first, respectively second, crossbeam;

each dashboard crossbeam assembly comprises a first and a second tips for fastening the crossbeam to a vehicle body; and the second tip for fastening the first dashboard crossbeam assembly is different from the second tip for fastening the second dashboard crossbeam assembly.

BRIEF DESCRIPTION OF THE DRAWINGS

Other features, details and advantages will become apparent on reading the following detailed description and the analysis of the appended drawings, in which.

DETAILED DESCRIPTION

In the various figures, the same references designate elements that are identical or are identical in function. Only the differences between the different examples presented are described in detail.

Figure 1:
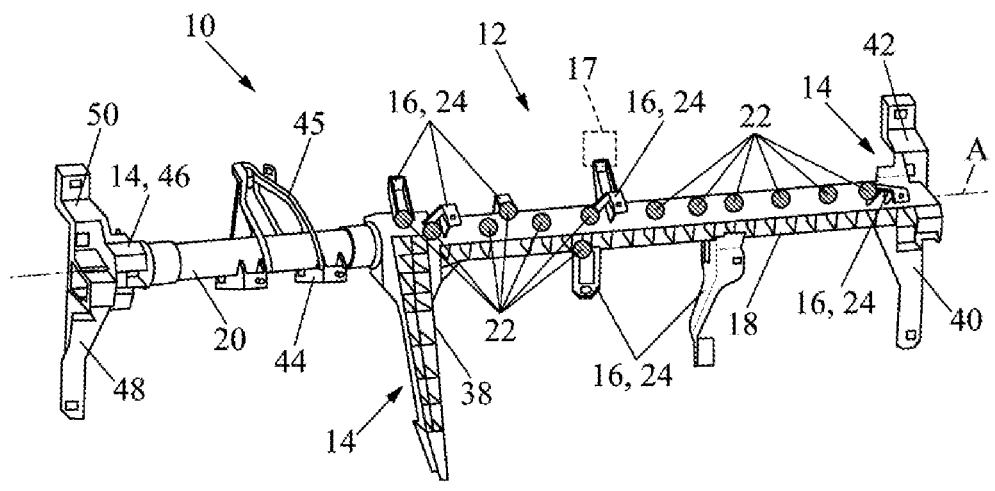
FIG. 1 is a perspective view of an example of a dashboard crossbeam assembly for a motor vehicle.

FIG. 1 represents an example dashboard crossbeam assembly 10 for a motor vehicle.

The dashboard crossbeam assembly 10 is intended to form a dashboard D structure element of the motor vehicle V. The dashboard crossbeam assembly 10 is especially intended to stiffen the body BIW (for body in white) of the motor vehicle V and/or to support equipment or accessories of the motor vehicle V, especially the dashboard D and/or a steering column and/or air ducts of a heating, ventilation and air conditioning system HVAC of the passenger compartment of the motor vehicle V and/or a screen S and/or a glove compartment G and/or airbag module Ab and/or a heads-up display H.

As shown, the dashboard crossbeam assembly 10 substantially comprises a crossbeam 12, means 14 for fastening the crossbeam to the body BIW of the motor vehicle V, and means 16 for attaching accessories 17 to the crossbeam 12.

As shown in FIG. 1, the crossbeam 12 here comprises a first longitudinal portion 18 made of a plastic-containing material, and a second longitudinal portion 20 made of metal, for example steel. The term "plastic-containing material" is understood here to mean a plastic material, optionally loaded with reinforcing fibers, especially glass fibers. Thus, plastic-containing materials comprise plastics and composite materials. Here, the two longitudinal portions 18, 20 extend next to one another in the direction of the axis A in which the crossbeam 12 extends. In other words, here, a majority of the length of the first longitudinal portion 18 and/or a majority of the length of the second longitudinal portion 20 are not superimposed, in a direction perpendicular to the direction of the axis A in which the crossbeam 12 extends.

The first longitudinal portion 18 is for example made of plastic-containing material. The term "plastic-containing material" is understood here to mean a plastic material, optionally loaded with fibers, in particular glass fibers. The material of which the first longitudinal portion 18 of the crossbeam 12 is formed comprises for example at least 50% by mass of glass or carbon fibers, preferably at least 60% by mass of glass or carbon fibers. The first longitudinal portion 18 has a general cylindrical shape, comprising a substantially constant external cross-section, over substantially the entire length of the first longitudinal portion 18, especially over at least 50% of the length of the first longitudinal portion 18 of the crossbeam 12, preferably over at least 75% of the length of the first longitudinal portion 18 of the crossbeam 12. The first longitudinal portion 18 of the crossbeam 12 preferably forms hollow housings, separated by walls. The hollow housings are for example arranged next to one another in the direction of the axis A in which the crossbeam 12 extends. Thus, the first longitudinal portion 18 of the crossbeam 12 has a good compromise between rigidity or impact strength, on the one hand, and weight, on the other hand. In one embodiment, the first longitudinal portion 18 has a substantially "S"-shaped cross-section comprising three substantially parallel branches, here substantially horizontal. Hollow housings or cells may then be arranged between an upper branch of the "S" and a central branch of the "S", and/or between the central branch of the "S" and a lower branch of the "S".

Furthermore, as can be seen especially in FIG. 1, a plurality of fastening interfaces 22 are present on the first longitudinal portion 18 of the crossbeam 12. The fastening interfaces 22 here allow for the attachment of fastening tabs 24. The fastening tabs 24 in turn enable the attachment of accessories 17. The fastening tabs 24 are alternatively integrated to the accessories 17.

The fastening interfaces 22 may especially number at least 10, preferably at least 12, even more preferably at least 14. Alternatively, the number of fastening interfaces 22 may be less than 10, in particular less than 8, even more preferably less than 6.

The fastening interfaces 22 may all be identical. Alternatively, the fastening interfaces 22 are different, especially the fastening interfaces 22 comprise at least one first fastening interface 22 of a first type, preferably a plurality of such first fastening interfaces 22 of a first type, and at least one second fastening interface 22 of a second type, different from the first type of fastening interface 22, preferably a plurality of such second fastening interfaces 22 of a second type. The fastening interfaces 22 may be arranged on different lateral sides and/or faces of the first longitudinal portion 18.

Figure 2:
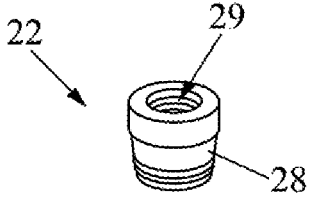
FIG. 2 is a perspective view of a first example of an insert that can be implemented to define a fastening interface in the dashboard crossbeam assembly for motor vehicle of FIG. 1.

FIG. 2 shows a first example of a type of fastening interface 22. Here, the fastening interface 22 is formed by an insert 28, for example metal or plastic, attached to the first longitudinal portion 18 of the crossbeam 12. The insert 22 may in particular be overmolded by the first longitudinal portion 18 of the crossbeam 12 or be screwed into a housing provided for this purpose and formed by the first longitudinal portion 18 of the crossbeam 12. The insert 28 may form a threaded housing 29 to allow attachment of a fastening tab 24 by means of a screw, for example.

Figure 3:
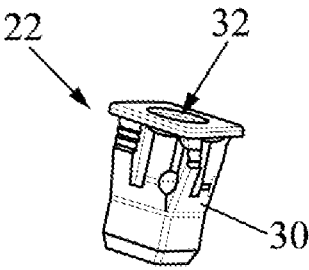
FIG. 3 is a perspective view of an example of an insert that can be implemented to define a fastening interface in the dashboard crossbeam assembly for a motor vehicle of FIG. 1.

FIG. 3 shows a second example of a type of fastening interface 22. Here again, the fastening interface 22 is formed by an insert 30. The insert 30 is for example made of plastic or metal. The insert 30 may in particular be overmolded by the first longitudinal portion 18 of the crossbeam 12 or be force-fitted into a housing provided for this purpose and formed by the first longitudinal portion 18 of the crossbeam 12. According to yet another alternative, the insert 30 is elastically fitted (or "snap-fitted") in a housing provided for this purpose, formed by the first longitudinal portion 18 of the crossbeam 12. To do this, the insert 30 may have at least one elastic fitting relief (or snap-fit relief) on its outer surface.

The insert 30 forms a housing 32 adapted to receive a complementary relief to allow the attachment of a fastening tab 24. The complementary relief may be force-fitted into the housing 32 and be clamped therein. The complementary relief can alternatively or additionally be an elastic fitting relief in the housing 32.

Figure 4:
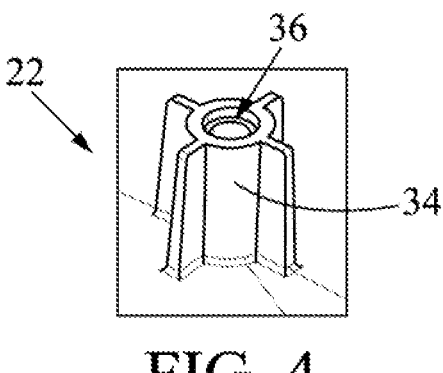
FIG. 4 schematically represents in perspective an example relief that can be formed in the dashboard crossbeam assembly for a motor vehicle of FIG. 1, defining a fastening interface.
Figure 5:
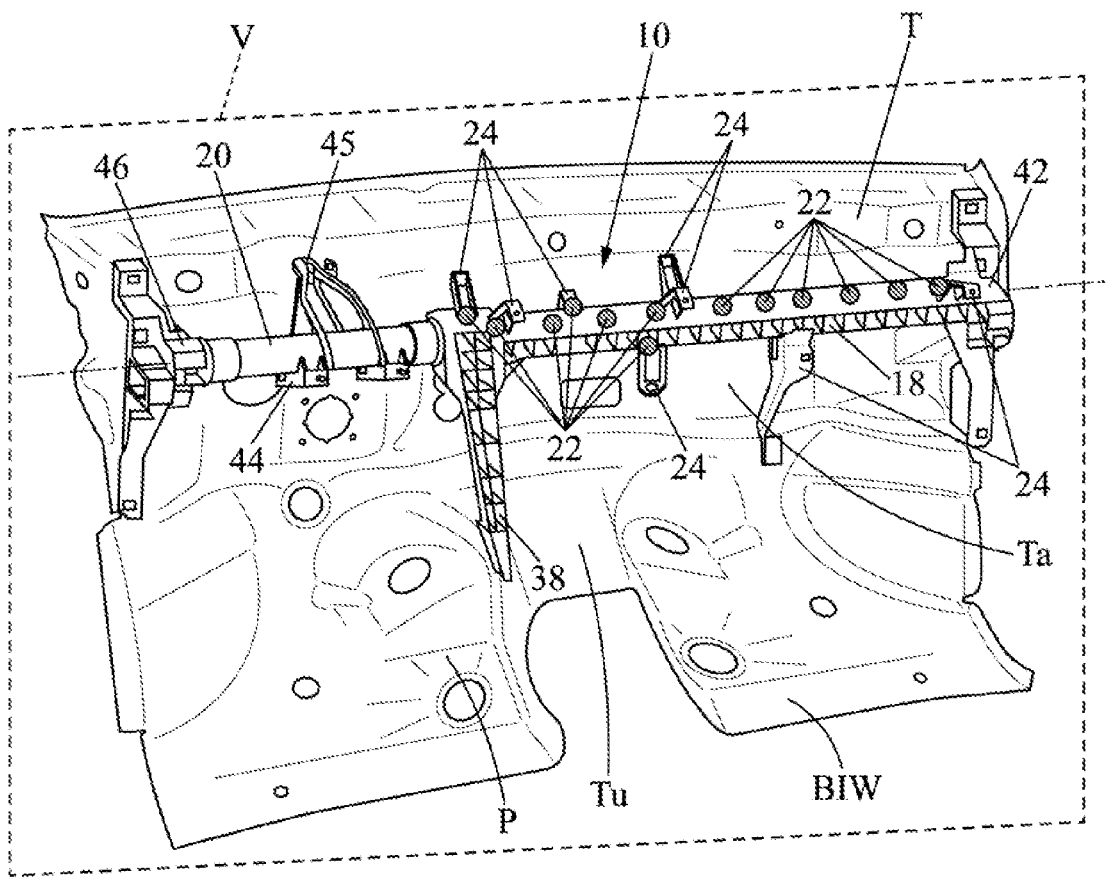
FIG. 5 schematically represents in perspective the fastening of the dashboard crossbeam assembly for a motor vehicle in FIG. 1 to the body of a motor vehicle.
Figure 6:
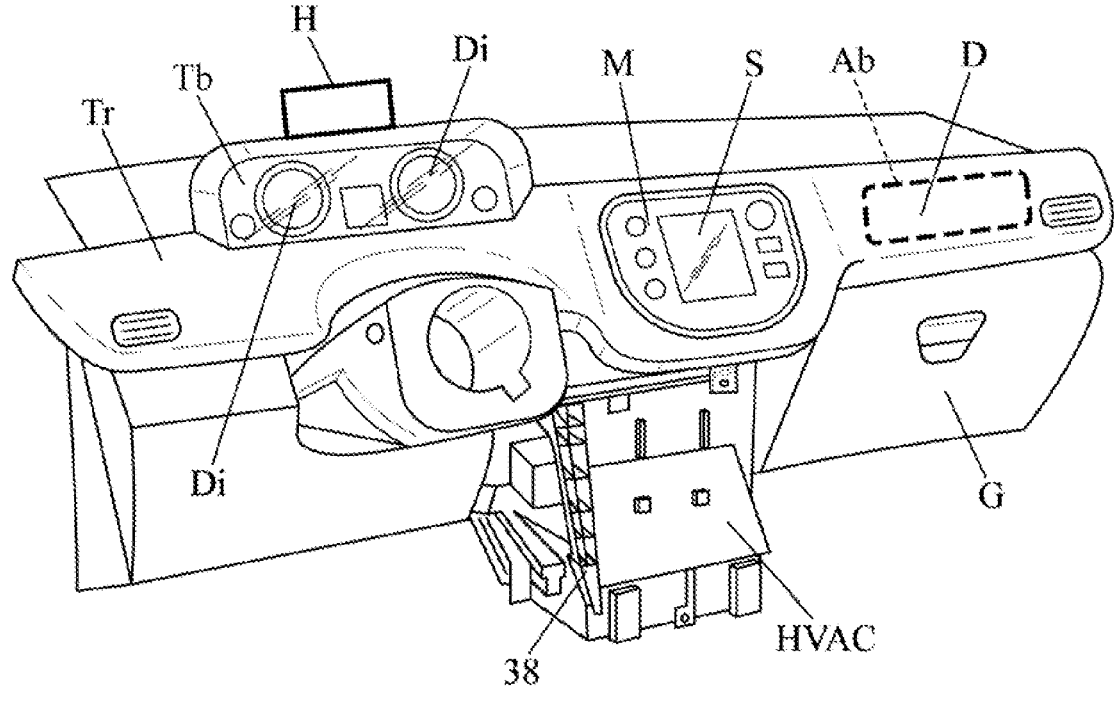
FIG. 6 schematically shows in perspective a motor vehicle dashboard, attached to the body of a motor vehicle by means of the dashboard crossbeam assembly of FIG. 1.

FIG. 4 shows a third example of a type of fastening interface 22. Here, the fastening interface 22 is formed by the first longitudinal portion 18 of the crossbeam 12. The fastening interface 22 is thus integral with (or made of the same piece as) the first longitudinal portion 18 of the crossbeam 12. The fastening interface 22 takes, according to this example, the shape of a relief 34, here projecting, defining a housing 36. The housing 36 alternatively can allow the elastic fitting, attachment by means of a screw, or force-fitting of an element of a fastening tab 24, clamped in the housing 36.

The fastening tabs 24 attached to the first longitudinal portion 18 of the crossbeam 12 allow an accessory 17 of the dashboard D of the vehicle V to be attached to the crossbeam 12. Each accessory 17 that can thus be attached to the crossbeam 12, especially on the first longitudinal portion 18 of the crossbeam 12, by means of one or more fastening tabs 24, may in particular be selected from:

a glove compartment G;
an airbag module Ab;
an electronic module M;
a screen S, especially a central screen;
a dashboard D;
an interior trim Tr, especially on the driver side and/or passenger side;
a head-up display H;
a dashboard Tb comprising at least one equivalent counter or device Di for displaying information relating to the motor vehicle V, especially a velocity and/or engine speed counter of the motor vehicle V and/or at least one such counter or display device Di.

Alternatively or additionally, at least one fastening tab 24 can be attached to the body BIW of the motor vehicle V thus strengthening the attachment of the dashboard crossbeam assembly 10 on the body BIW of the motor vehicle V. Such a fastening tab 24 may for example be attached to the apron Ta of the body BIW of the motor vehicle or a lower bay crossbeam T of the body BIW of the motor vehicle V.

It is recalled here that the body BIW of a motor vehicle V comprises, from front to rear, an engine compartment which is closed by a hood and which is separated from the passenger compartment of the vehicle by an apron, Ta and, in the upper part, by a lower bay crossbeam T. The lower bay crossbeam T may be integral with the apron Ta. The lower bay crossbeam Ta then differs from the apron T in that it extends substantially horizontally while the apron Ta instead extends rather vertically or obliquely in the vertical direction. The lower bay crossbeam T is intended to support a lower part of a windscreen of the motor vehicle V.

Between the two longitudinal ends of the crossbeam 12, the first longitudinal portion 18 of the crossbeam 12 comprises a strut 38 for fastening the crossbeam 12 to the body BIW of a motor vehicle V. Here, the strut 38 is integral with the rest of the first longitudinal portion 18 of the crossbeam 12. Alternatively, the strut 38 may be attached to the first longitudinal portion 18 of the crossbeam 12, in particular in the form of an tip. In all cases, the strut 38 is preferably made of a plastic-containing material, in particular of composite material. The strut 38 may be adapted to be attached to the floor P of the vehicle V, in particular the tunnel Tu formed by the floor P of the vehicle V and/or to a heating, ventilation and air conditioning unit HVAC of the motor vehicle V.

It is recalled here that the tunnel Tu of the floor of the body BIW is the portion with a substantially U-shaped cross-section oriented downward, formed on the floor P of the body BIW to receive in particular one or more exhaust ducts and/or a transmission shaft.

Furthermore, here, the first longitudinal portion 18 of the crossbeam 12 also forms a first segment 40 for attaching to the body BIW of the motor vehicle V, at the free end of the crossbeam 12 formed by the first longitudinal portion 18 of the crossbeam 12.

Finally, the first longitudinal portion 18 of the crossbeam 12 forms a second segment 42 for attaching to the body BIW, also disposed at the free end of the crossbeam 12 formed by the first longitudinal portion 18 of the crossbeam 12. The second fastening segment 42 is here adapted to be attached to an A-pillar of the body BIW of the motor vehicle V.

It may be noted here that the first and second fastening segments 40, 42 may be formed by a part attached to the first longitudinal portion 18 of the crossbeam 12, in particular in the form of a tip (or stirrup).

Furthermore, the second longitudinal portion 20, made of metal, is here attached to the first longitudinal portion 18 of the crossbeam 12. For example, the first longitudinal portion 18 of the crossbeam 12 defines, at a longitudinal end, a housing for receiving a longitudinal end of the second longitudinal portion 20. Of course, a reciprocal configuration can be envisaged, according to which the second longitudinal portion 20 defines at a longitudinal end a housing for receiving a longitudinal end of the first longitudinal portion 18 of the crossbeam 12.

As shown in FIG. 1, a steering column support 44 is attached here to the second longitudinal portion 20 of the crossbeam 12. Specifically, it appears preferable that such a steering column support 44 be attached to a portion of the crosspiece 12 made of metal, in order to ensure satisfactory resistance in the event of an impact, in particular a frontal impact. In other words, such a configuration wherein a steering column support 44 is attached to a metal portion of the crossbeam 12 appears preferable for the purposes of the safety of the driver of the motor vehicle V.

Furthermore, a device 45 for attaching the crossbeam 12 on to the body BIW of the vehicle V, in particular the apron Ta of the body BIW of the motor vehicle and/or to the lower bay crossbeam T of the body BIW of the motor vehicle V may be attached to the second longitudinal portion 20 of the crossbeam 12. For example, as shown, the fastening device 45 is arranged substantially at the same level longitudinally on the second longitudinal portion 20 of the crossbeam 12, as the steering column support 44.

Finally, a tip 46 (or stirrup) is here attached to the end of the second longitudinal portion 20 of the crossbeam 12, forming a free end of the crossbeam 12. The tip 46 forms, for example, a housing for receiving a longitudinal end of the second longitudinal portion 20 of the crossbeam 12. Alternatively, the tip 46 can be received in a housing formed for this purpose at the longitudinal end of the second longitudinal portion 20 of the crossbeam 12, forming a free end of the crossbeam 12.

The tip 46 here forms two segments 48, 50 for fastening the crossbeam 12 on the body BIW of the motor vehicle V. A first fastening segment 48 is intended to be attached to the body 26 of the motor vehicle V, under the crossbeam 12. A second fastening segment 50 is intended to be attached to a A-pillar of the body BIW of the motor vehicle V.

Other means for producing the fastening segments 48, 50 are accessible to a person skilled in the art, especially, here the two fastening segments 48, 50 are integral (or made from the same part). Alternatively, the fastening segments 48, 50 can be made from separate parts, optionally attached to one another.

Figure 7:
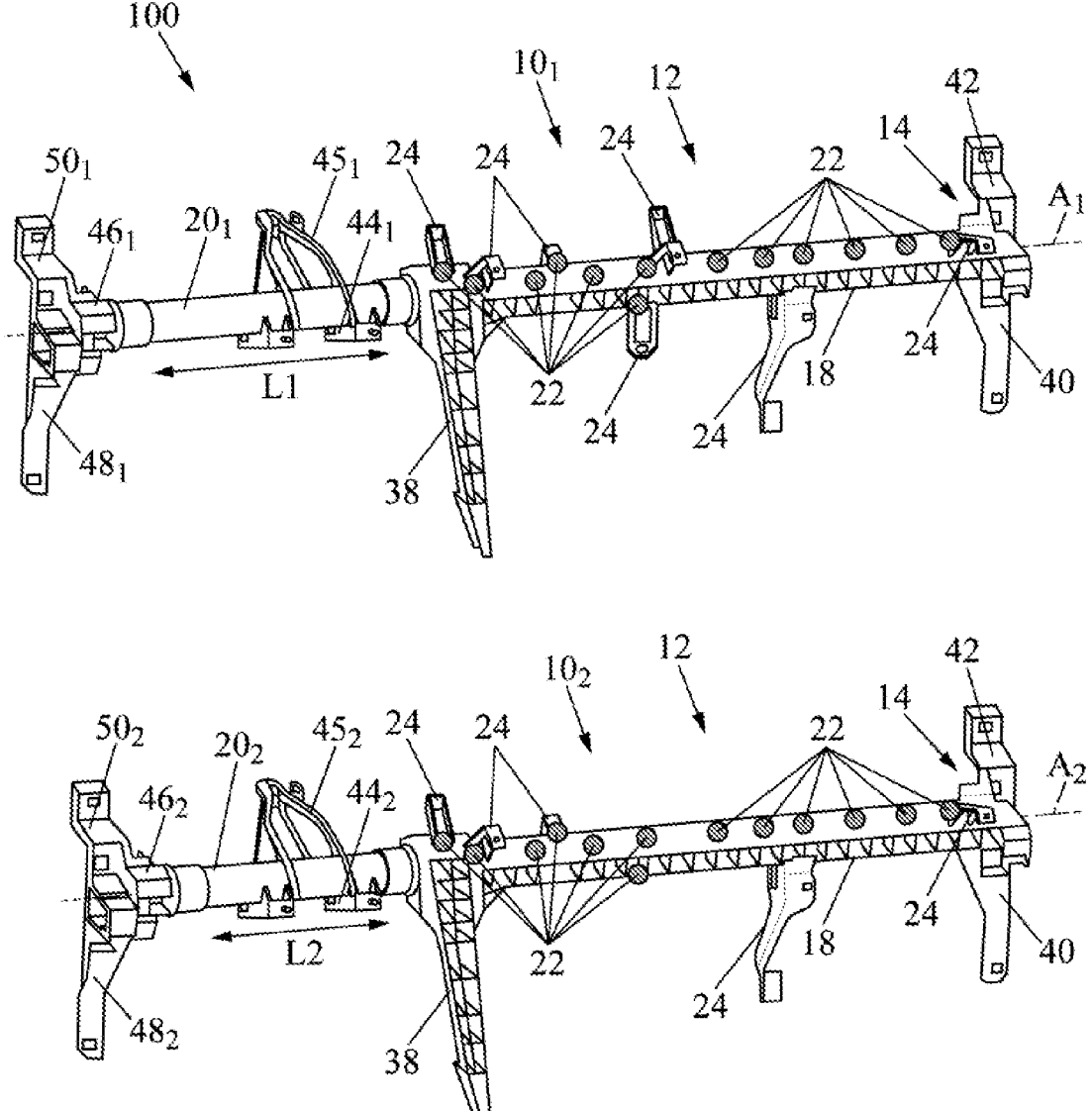
FIG. 7 schematically shows in perspective a set of two dashboard crossbeam assemblies for a vehicle of the type shown in FIG. 1, different, but including identical crossbeam portions made of plastic containing material.

Advantageously, and as shown in FIG. 7, a dashboard crossbeam assembly 10 as has just been described, can easily be adapted to different vehicles V—in particular to different geometries of bodies BIW—and/or to different configurations of the dashboard D of the same series of motor vehicles V, all implementing an identical body BIW. In other words, a dashboard crossbeam assembly 10 as has just been described can easily be adapted to different configurations of vehicles V, in particular to different accessory configurations 17 corresponding for example to different options of the same motor vehicle (that is with the same body BIW) and/or different motor vehicle configurations V (that is having a body BIW). It is thus possible to form a set 100 of different dashboard crossbeam assemblies 10₁, 10₂ each comprising a first longitudinal portion 18 of the crossbeam 12, the first longitudinal portions 18 of the crossbeam 12 of the dashboard crossbeam assemblies 10₁, 10₂ being identical.

As shown in FIG. 7, differences between dashboard assemblies 10₁,10₂ can take many forms.

According to a first example, this difference between dashboard assemblies 10₁,10₂, may consist of a different configuration of the fastening tabs 24. "Different configuration of the fastening tabs 24", is understood here to mean:

a different number of fastening tabs 24 attached to the crossbeam 12, in particular on the first longitudinal portion 18 of the crossbeam 12, and/or
a different position of at least one fastening tab 24 on the crossbeam 12, in particular on the first longitudinal portion 18 of the crossbeam 12; and/or
at least one different fastening tab 24.

According to a second example, the difference between the dashboard crossbeam assemblies 10₁, 10₂ may consist of second longitudinal portions 20₁, 20₂ that differ, in particular by their lengths L1, L2. Thus, the dashboard crossbeam assemblies 10₁, 10₂ can be implemented in different vehicles, with different bodies BIW, in particular of different widths, while implementing identical first longitudinal portions 18 of the crossbeam 12. Alternatively or additionally, the second longitudinal portions 20₁, 20₂ of the dashboard crossbeam assemblies 10₁, 10₂ may vary by the diameter of their cross-sections, to be more or less rigid.

The fastening segments 50₁, 50₂, 48₁, 48₂ may also be different. This may allow different fastenings of the dashboard crossbeam assemblies 10₁, 10₂ on the body BIW of different motor vehicles.

Likewise, in the case where the fastening segments 40, 42 are formed by a part attached to the first longitudinal portion 18 of the crossbeam 12, these fastening segments 40, 42 may differ from a dashboard crossbeam assembly 10₁, 10₂ to another dashboard crossbeam assembly 10₂, 10₁, while the first longitudinal portions 18 of the crossbeam 12 are identical.

Finally, when the strut 38 is attached to the first longitudinal portion 18 of the crossbeam 12, then the strut 38 of a dashboard crossbeam assembly 10₁,10₂ may be different from the strut 38 of another dashboard crossbeam assembly 10₂,10₁, albeit implementing an identical first longitudinal crossbeam 12 portion 18. This can in particular allow a different attaching of the strut 38, for example, on the tunnel Tu or on the housing of a heating, ventilation and air conditioning device HVAC.

Thus, vehicle dashboard crossbeam assemblies 10₁, 10₂ are created which are adapted to different configurations of motor vehicles and which nevertheless comprise a portion 18 made of an identical plastic-containing material, made for example by means of the same mold. The development and manufacturing costs of the various dashboard crossbeam assemblies 10₁, 10₂ are thus limited by implementing an identical first longitudinal portion 18 in each of these dashboard crossbeam assemblies. In addition, the first longitudinal portion 18 made in a more resistant material, can withstand high stresses, in particular in the event of an accident. As the fastening tabs 24 are not integral with the first longitudinal portion 18, this makes it possible to use different materials, in particular less costly and/or less heavy ones, such as plastics, with little or no load of reinforcing fibers, or metal.

The invention is not limited to only the examples of embodiments described above, but rather is capable of numerous variants accessible to a person skilled in the art.

The shown examples all show that the steering column support 44 is on the left for a left-hand drive vehicle. However, as a variant, this steering column support may also be on the right for a right-hand drive vehicle.

Furthermore, attaching the strut 38 to the body BIW can be done using any suitable means accessible to a person skilled in the art, in particular by welding, screwing, or riveting. The same applies to attaching the fastening segments 40, 42, 48, 50.

In the examples described, each dashboard crossbeam assembly consists of:

a first longitudinal crossbeam 12 portion 18 provided with fastening interfaces 22;
tabs 24 for fastening accessories 17;
a second longitudinal crossbeam 12 portion 20 attached to the first longitudinal portion 18;
a steering column support 44 attached to the second longitudinal crossbeam 12 portion 20;
a tip 46 or stirrup, attached to the second longitudinal crossbeam 12 portion 20.

Alternatively, however, other dashboard crossbeam assembly configurations are conceivable. In particular, each dashboard crossbeam assembly may comprise, in addition to the elements indicated above:

a second tip attached to the first longitudinal crossbeam 12 portion 18, defining at least one segment for fastening the dashboard crossbeam assembly onto the body BIW of a motor vehicle V; and/or
a strut 38 attached to the first longitudinal crossbeam 12 portion 18, intended to be attached to the body BIW of the motor vehicle V; and/or

a fitting for fastening the first and second longitudinal crossbeam 12 portions 18, 20.

In an embodiment not shown, the crossbeam 12 comprises a single longitudinal portion 18. In other words, the crossbeam 12 may be made of plastic material over its entire length. In this case, the crossbeam 12 can in particular be produced by injection of plastic-containing material.

The invention claimed is:

1. A set of dashboard crossbeam assemblies for a vehicle, having:

at least one first dashboard crossbeam assembly for a vehicle, the first dashboard crossbeam assembly comprising a first crossbeam, at least one first longitudinal portion of which is made of a plastic-containing material, the first longitudinal portion comprising a plurality of first fastening interfaces of fastening tabs, and at least one second dashboard crossbeam assembly for a vehicle, the second dashboard crossbeam assembly comprising a second crossbeam, at least one first longitudinal portion of which is made of a plastic-containing material, the first longitudinal portion of the second crossbeam comprising a plurality of second fastening interfaces of fastening tabs, a set in which the at least one first dashboard crossbeam assembly and the at least one second dashboard crossbeam assembly are different, the first longitudinal portion of the first crossbeam and the first longitudinal portion of the second crossbeam being identical, wherein:

the first dashboard crossbeam assembly comprises at least one first fastening tab attached to at least one first fastening interface according to a first configuration for attaching fastening tabs on the first longitudinal portion of the first crossbeam, the second dashboard crossbeam assembly comprises at least one second fastening tab attached to at least one second fastening interface, according to a second configuration for attaching fastening tabs on the first longitudinal portion of the second crossbeam, and the first configuration for attaching fastening tabs on the first longitudinal portion of the first crossbeam is different from the second configuration for attaching fastening tabs on the first longitudinal portion of the second crossbeam.

2. The set of dashboard crossbeam assemblies according to claim 1, wherein the first configuration for attaching fastening tabs on the first longitudinal portion of the first crossbeam is different from the second configuration for attaching fastening tabs on the first longitudinal portion of the second crossbeam by the number of fastening tabs.

3. The set of dashboard crossbeam assemblies according to claim 1, wherein the first configuration for attaching fastening tabs on the first longitudinal portion of the first crossbeam is different from the second configuration for attaching fastening tabs on the first longitudinal portion of the second crossbeam by at least one fastening tab used.

4. The set of dashboard crossbeam assemblies according to claim 1, wherein the first configuration for attaching fastening tabs on the first longitudinal portion of the first crossbeam is different from the second configuration for attaching fastening tabs on the first longitudinal portion of the second crossbeam by the position of at least one fastening interface implemented to attach the fastening tabs.

5. A set of dashboard crossbeam assemblies for a vehicle, having:

at least one first dashboard crossbeam assembly for a vehicle, the first dashboard crossbeam assembly comprising a first crossbeam, at least one first longitudinal portion of which is made of a plastic-containing material, the first longitudinal portion comprising a plurality of first fastening interfaces of fastening tabs, and at least one second dashboard crossbeam assembly for a vehicle, the second dashboard crossbeam assembly comprising a second crossbeam, at least one first longitudinal portion of which is made of a plastic-containing material, the first longitudinal portion of the second crossbeam comprising a plurality of second fastening interfaces of fastening tabs, a set in which the at least one first dashboard crossbeam assembly and the at least one second dashboard crossbeam assembly are different, the first longitudinal portion of the first crossbeam and the first longitudinal portion of the second crossbeam being identical, wherein the plurality of first fastening interfaces of fastening tabs and the plurality of second fastening interfaces of fastening tabs comprise at least one among:

at least one insert for fastening by screwing, by elastic fitting or by force-fitting, attached in the first longitudinal portion of the first, respectively second, crossbeam, and at least one relief for fastening by screwing, by elastic fitting or by force-fitting, formed by the first longitudinal portion of the first, respectively second, crossbeam.

6. A set of dashboard crossbeam assemblies for a vehicle, having:

at least one first dashboard crossbeam assembly for a vehicle, the first dashboard crossbeam assembly comprising a first crossbeam, at least one first longitudinal portion of which is made of a plastic-containing material, the first longitudinal portion comprising a plurality of first fastening interfaces of fastening tabs, and at least one second dashboard crossbeam assembly for a vehicle, the second dashboard crossbeam assembly comprising a second crossbeam, at least one first longitudinal portion of which is made of a plastic-containing material, the first longitudinal portion of the second crossbeam comprising a plurality of second fastening interfaces of fastening tabs, a set in which the at least one first dashboard crossbeam assembly and the at least one second dashboard crossbeam assembly are different, the first longitudinal portion of the first crossbeam and the first longitudinal portion of the second crossbeam being identical, wherein each dashboard crossbeam assembly comprises at least one first tip for attaching the crossbeam to a vehicle body, the first tip of the first dashboard crossbeam assembly being different from the first tip of the second dashboard crossbeam assembly.

* * * * *